United States Patent [19]

Genrich

[11] Patent Number: 4,636,734
[45] Date of Patent: Jan. 13, 1987

[54] LOW SPURIOUS NUMERICALLY CONTROLLED OSCILLATOR APPARATUS AND METHOD

[75] Inventor: Thad J. Genrich, Mesa, Ariz.

[73] Assignee: Motorola, Inc., Schaumburg, Ill.

[21] Appl. No.: 862,193

[22] Filed: May 9, 1986

Related U.S. Application Data

[63] Continuation of Ser. No. 510,504, Jul. 5, 1983, abandoned.

[51] Int. Cl.⁴ .................. H01L 7/00; H03K 5/159
[52] U.S. Cl. .................................. 328/55; 307/271; 331/177 R
[58] Field of Search ............ 307/271, 272; 328/55; 331/44, 177 R

[56] References Cited

U.S. PATENT DOCUMENTS

| | | | |
|---|---|---|---|
| 3,223,925 | 12/1965 | Florac, Jr. et al. | 325/163 |
| 3,428,905 | 2/1969 | Fierston et al. | 328/127 |
| 3,657,657 | 4/1972 | Jefferson | 328/14 |
| 3,659,048 | 4/1972 | Zuerblis et al. | 328/27 |
| 3,719,897 | 3/1973 | Tarr | 331/177 R |
| 3,984,771 | 10/1976 | Nossen et al. | 328/14 |

Primary Examiner—Stanley D. Miller
Assistant Examiner—B. P. Davis
Attorney, Agent, or Firm—Eugene A. Parsons

[57] ABSTRACT

Generating a digital signal from the output of a numerically controlled oscillator and delaying certain transitions of the digital to produce an output digital signal having a generally 50% duty cycle and a frequency determined by a frequency select input to the numerically controlled oscillator.

8 Claims, 4 Drawing Figures

LOW SPURIOUS NUMERICALLY CONTROLLED OSCILLATOR APPARATUS AND METHOD

This application is a continuation of application Ser. No. 510,504, filed July 5, 1983, now abandoned.

BACKGROUND OF THE INVENTION

Numerically controlled oscillators (or binary adder frequency synthesizers) have several desirable features which make them useful for a number of applications. Some of these features are accuracy, stability and fast locking characteristics. One drawback of utilizing a numerically controlled oscillator (NCO) in an RF generator design is the presence of spurious outputs. Generally, the digital signal output of the NCO is not a perfect square-wave (50% duty cycle) but has transitions which are erratic in time compared to an ideal output. These erratic pulses are repetitive in nature and serve to create spurious outputs.

A traditional means of reducing spurious outputs from an NCO is to utilize the digital signal output from the NCO as an address input for a sine lookup table. The sine lookup table converts the digital word from the NCO into an approximation of the amplitude of a sine wave corresponding to that value. Thus, the output is an analog sine wave rather than a digital output signal. The disadvantages of utilizing this configuration for RF signal generation are the speed limitations of the lookup table and the low frequency of the output compared to the NCO clock rate, typically 1/5 or less.

Another method of reducing spurious outputs from an NCO is to divide the NCO output by a fixed number, n. This process succeeds in reducing the spurious outputs by 20 log n, however, it also suffers the disadvantage of reducing the maximum output frequency.

SUMMARY OF THE INVENTION

The present invention pertains to low spurious numerically controlled oscillator apparatus wherein the digital output signal of a numerically controlled oscillator is utilized to generate a digital signal of the correct frequency and erratic transitions are delayed to produce a digital signal having a generally 50% duty cycle and a frequency determined by the frequency select input of the numerically controlled oscillator.

It is an object of the present invention to provide new and improved low spurious numerically controlled oscillator apparatus.

It is a further object of the present invention to provide a new and improved method of producing a low spurious signal from a numerically controlled oscillator.

It is a further object of the present invention to provide apparatus for delaying erratic transitions of an output digital signal to produce a digital signal having the correct frequency and a generally 50% duty cycle.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1:
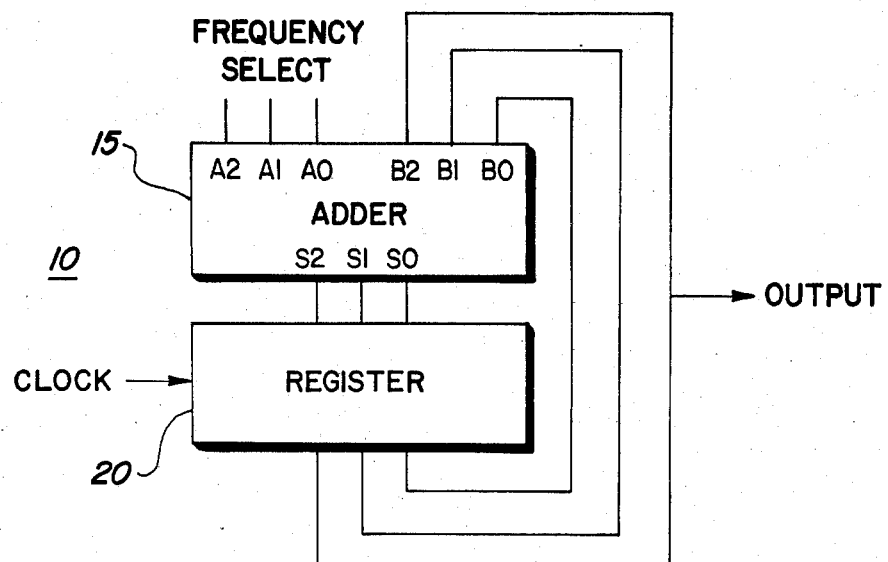
FIG. 1 is a block diagram of a 3-bit numerically controlled oscillator.

Referring specifically to FIG. 1, a simplified block diagram of a 3 bit NCO, generally designated 10, is illustrated. The NCO 10 includes an adder 15 and a register 20. A 3 bit input to adder 15, labeled A0, A1 and A2, is utilized for frequency selection. A second 3 bit input to the adder 15, labeled B0, B1 and B2, is connected directly to a 3 bit output of the register 20. The 3 bit output of the adder 15, labeled S0, S1 and S2 is connected directly to a 3 bit input of the register 20. The register 20 also has a clock input. The register 20 is updated with the output of the adder 15 at a rate determined by the clock input. The output of the NCO is taken from the most significant bit of the output of register 20, input B2 to adder 15.

The digital signal on the output of the NCO 10 toggles at the frequency selected by the 3 bit frequency select input to the adder 15. In the simple 3 bit NCO 10 illustrated in FIG. 1 eight different frequencies can be selected by way of the frequency select input. Depending upon the selected frequencies, transitions in the digital output signal will vary in the number and amount. It is of course understood that the greater the number of erratic transitions and/or the amount of error determines the spurious outputs. In the simple NCO of FIG. 1 a worst case frequency select input is the digital number 011. The waveforms of FIG. 2 depict the resulting waveforms for this worst case frequency select input.

Figure 2:
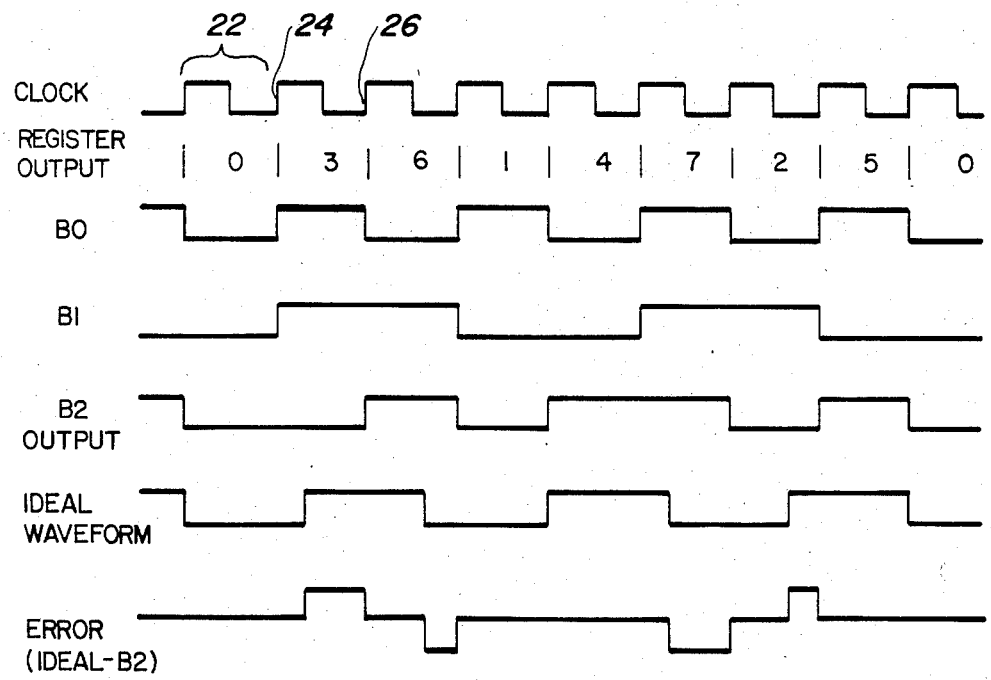
FIG. 2 illustrates a clock input, 3 waveforms available at the output of the register of the NCO of FIG. 1 and the numerical equivalent, and waveforms depicting the ideal output and the error in the output of the apparatus of FIG. 1.

Referring to the upper waveform of FIG. 2, the input clock signal is illustrated. Immediately below the clock signal waveform, a series of numbers depict the numerical output of register 20. The next three waveforms depict the actual output on each of the three lines from the register 20. Assuming that signals from adder 15 are clocked into register 20 on each low to high transition of the clock pulses and that the NCO has just been turned on so that the register 20 has all zeros therein, during the first clock pulse, labeled 22 in FIG. 2, the three line output of register 20 (also lines B0, B1 and B2 of adder 15) will all be low or zero. The second low to high transition 24 of the clock signal will cause the signal (011) on the frequency select input of adder 15 to be added to the output of register 20 and moved into register 20. Thus, the output of register 20 will now be zero on B2 and 1 on B1 and B0. The numerical designation for the binary number 011 is 3. At the third low to high transition 26 of the clock signal the register 20 receives an input which is the sum of the 011 frequency select signal and the 011 output from register 20. The binary number for this sum is 110, which is represented numerically by 6. Continuing with this procedure it will be seen that the B0, B1 and B2 waveforms and the numerical register outputs of FIG. 2 illustrate one complete cycle.

Referring to waveform B2 of FIG. 2, it can be seen that the output toggles at the desired frequency, every third transition of the output is aligned with every fourth clock pulse transition, but the intermediate transitions are erratic in time. Further study of the B2 waveform will show that the erratic pulses are repetitive in nature and serve to create the unwanted spurious outputs. Immediately below the B2 waveform of FIG. 2 an ideal waveform is constructed. The ideal waveform has the same frequency as the B2 waveform but the pulses are constructed so that the positive and negative portions are equal (50%) duty cycle. It should be noted that every third transition of the ideal waveform is still aligned with every third transition of the B2 waveform and every fourth low to high transition of the clock pulses. However, the two intermediate transitions have been shifted and the error between the B2 waveform and the ideal waveform is illustrated in a waveform directly below the ideal waveform in FIG. 2. The repetitive nature of the error is more obvious from this illustration.

Figure 3:
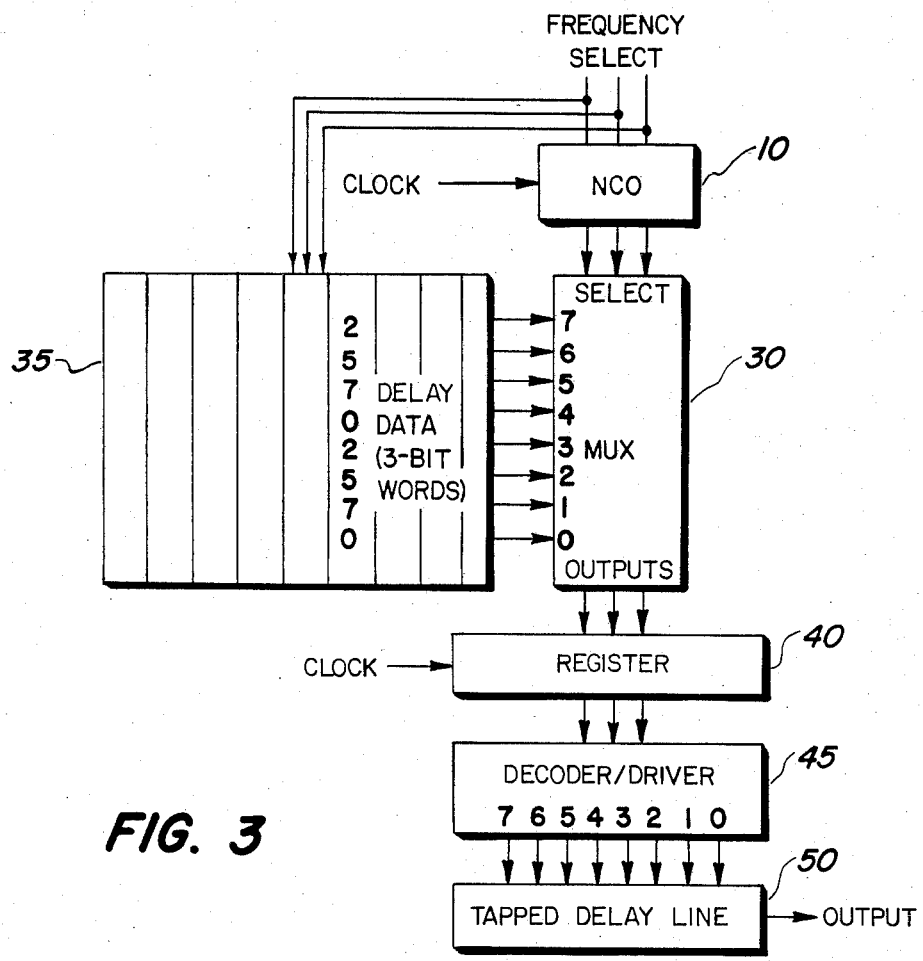
FIG. 3 is a block diagram of low spurious numerically controlled oscillator apparatus embodying the present invention.

Referring specifically to FIG. 3, low spurious numerically controlled oscillator apparatus is illustrated. The simple 3 bit numerically controlled oscillator 10 of FIG. 1 is illustrated as the NCO in this embodiment. However, it will be understood by those skilled in the art that greater frequency control can be achieved with a larger number of bits. The three output lines of the NCO 10 are connected to a select input of a multiplexer 30. A delay data memory 35 is connected by means of eight 3 bit lines to the multiplexer 30 and the select input from the NCO 10 determines which of the eight lines is connected to 3 output lines of the multiplexer 30. The delay data memory 35, in this embodiment, includes eight different delay patterns which are connected to and selected by the frequency select input of the NCO 10. Each of the eight different patterns is asssociated with a different one of the eight possible frequencies which can be selected by the frequency select input. The three line output of the multiplexer 30 is supplied to a 3 line input of a register 40, which also has a clock input, in this embodiment the same clock input as the NCO 10. Three output lines of the register 40 are supplied to a decoder/driver 45 which has 8 output lines that are connected to an eight tapped delay line 50. The output of the delay line 50 is the low spurious output of the numerically controlled oscillator apparatus.

In the worst case example of FIG. 2, the frequency select signal 011 is supplied to the memory 35 which connects the memory pattern 0, 7, 5, 2, 0, 7, 5, 2 to the eight outputs 0-7, as illustrated. As the NCO 10 cycles through 8 clock pulses the 3 line output selects inputs to the multiplexer 30 from the memory 35 in the following order: 0, 3, 6, 1, 4, 7, 2, 5, 0, etc. (see FIG. 2). Thus, the output of the multiplexer 30 to the register 40 is the 3 bit binary representation for the number 0, 2, 5, 7, 0, 2, 5, 7, etc.

The delay line 50 in conjunction with the driver portion of the decoder/driver 45, is designed to provide a continous output signal with transitions therein delayed in accordance with which of the eight specific inputs receives a signal from the decoder/driver 45. The delay line 50 has a maximum delay of 1 clock pulse with the 0 input having no delay, the 1 input having 1/7 delay, the 2 input having 2/7 delay, etc., and the 7 input having no output. Thus, as the register 40 is clocked the decoder driver 45 is connected to the tapped delay line 50 through the 0 input on the first clock pulse, the 2 input on the second clock pulse, the 5 input on the third clock pulse, the 7 input on the fourth clock pulse, the 0 input on the fifth clock pulse, etc.

Since the ideal waveform of FIG. 2 contains three transitions for 4 low to high transitions of the clock signal, there should be 1 ⅓ clock pulses between each transition of the ideal waveform. Thus, the first transition of the ideal waveform is in synchronization with the clock pulse. The second transition of the ideal waveform occurs ⅓ of a clock pulse after the first full clock cycle, or ⅓ of a clock pulse after the second transition of the clock pulse. The third transition of the ideal waveform occurs ⅔ of a clock pulse after the second full clock cycle, and the third transition of the ideal waveform is again in synchronization with the clock signal so that the fourth clock transition should not cause a change in the ideal waveform. Thus, to produce the ideal waveform the first clock transition should produce an immediate transition in the ideal waveform, the second clock transition produces a transition in the ideal waveform ⅓ of a clock pulse later, the third clock transition produces a transition in the ideal waveform ⅔ of a clock pulse later, the fourth clock transition produces no change in the ideal waveform and the fifth clock transition again produces an immediate transition in the ideal waveform.

Figure 4:
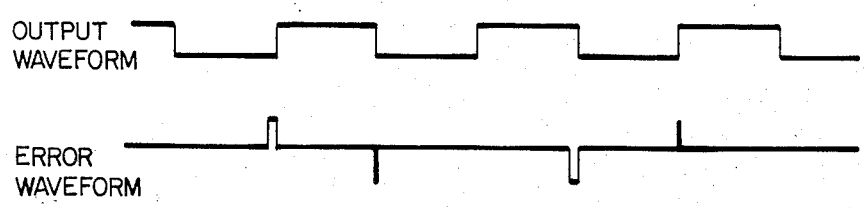
FIG. 4 illustrates an output waveform of the apparatus of FIG. 3 and the error therein.

In the embodiment of FIG. 3 the closest tap in the delay line 50 to ⅓ of a cycle is the number 2 (2/7) tap. The closest tap to the ⅔ of a cycle delay is the number 5 tap (5/7). The number 7 tap provides no output and therefor, is selected for the fourth input clock pulse. The output waveform from delay line 50 produced in this manner is illustrated in FIG. 4. Since the delays are 2/7 and 5/7, rather than ⅓ and ⅔, a slight error is still prevalent, which error is illustrated in the bottom waveform of FIG. 4. However, because this error is very small the spurious output is greatly reduced. Calculations were made to determine the effect of the spurious reduction and the results showed a 25db reduction in the total power contained in the error waveform. It will of course be understood that further reductions could be realized with greater resolution in the delay memory 35 and/or the decoder/driver 45 and tap delay line 50. Resolution will be limited by memory size and delay line accuracy.

Thus, improved low spurious numerically controlled oscillator apparatus is illustrated wherein the spurious output of a numerically controlled oscillator is greatly reduced. Further, the entire apparatus is digital except possibly the delay line 50, so that the entire apparatus could be formed on a single semiconductor chip, if desired. Also, while the delay line 50 might be formed as an analog delay line, it could instead be embodied in a series of digital delays if desired. While I have shown and described a specific embodiment of this invention further modifications and improvements will occur to those skilled in the art. I desire it to be understood, therefor, that this invention is not limited to the particular form shown and I intend in the appended claims to cover all modifications which do not depart from the spirit and scope of this invention.

I claim:
1. Low spurious numerically controlled oscillator apparatus comprising:
   a numerically controlled oscillator having a clock input, a frequency select input and an output, the output having an output signal thereon at a selected frequency defined by a signal on the frequency select input and with a periodically irregular duty cycle for at least some frequency select inputs; and radio frequency (RF) signal generating means coupled to the output of said numerically controlled oscillator for utilizing signals thereon to generate a digital signal having a generally 50% duty-cycle and the same selected frequency as the output signal of said nuemrically controlled oscillator.

2. Apparatus as claimed in claim 1 wherein the signal generating means includes a driver and delay means connected to produce a continuous output signal and coupled to the output of said numerically controlled oscillator for utilizing output signals thereon to produce a transition in the continuous output signal at the correct time to generate the generally 50% duty cycle and selected frequency.

3. Apparatus as claimed in claim 2 wherein the delay means includes a tapped delay line.

4. Apparatus as claimed in claim 2 wherein the signal generating means further includes memory means having predetermined delay patterns stored therein, said memory means being coupled to the frequency select input for selecting a predetermined delay pattern for each different selected frequency, being coupled to the output of the numerically controlled oscillator for selecting the specific delays in the selected delay pattern, and being coupled to the driver initiating the transitions.

5. Apparatus as claimed in claim 4 wherein the memory means is coupled to the output of the numerically controlled oscillator and to the driver by a multiplexer.

6. Apparatus as claimed in claim 5 wherein the multiplex is coupled to the driver by a clocked register.

7. Low spurious numerically controlled oscillator apparatus comprising:

adding means having a first plurality of inputs adapted to receive a frequency select digital input signal;
a second plurality of inputs and a plurality of outputs;
a digital register having a plurality of inputs coupled to the plurality of outputs of said adding means and a plurality of outputs coupled to the second plurality of inputs of said adding means; and said digital register further having an input adapted to receive clock pulses thereon; and
radio frequency (RF) digital signal generating means coupled to at least a most significant one of the plurality of outputs of said digital register for utilizing digital signals thereon at a selected frequency defined by a frequency select digital input signal on the first plurality of inputs of said adding means to generate a digital output signal having a generally 50% duty cycle and the same selected frequency as the selected frequency of the utilized digital signals.

8. A method of producing a low spurious signal from a numerically controlled oscillator and providing a frequency select input to produce an output signal at a desired frequency;
providing a predetermined pattern of delays corresponding to the specific frequency selected; and
generating a radio frequency (RF) digital signal utilizing the output signal from the numerically controlled oscillator and delaying at least some transitions of the digital signal in accordance with the predetermined pattern of delays to produce a digital signal having a generally 50% duty cycle and a frequency determined by the output signal of the numerically controlled oscillator.

* * * * *